(12) United States Patent
Hatakeyama

(10) Patent No.: US 8,861,852 B2
(45) Date of Patent: Oct. 14, 2014

(54) IMAGE PROCESSING METHOD FOR IMAGE RESTORATION, IMAGE PROCESSING APPARATUS AND IMAGE PICKUP APPARATUS

(75) Inventor: Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 62 days.

(21) Appl. No.: 13/467,098

(22) Filed: May 9, 2012

(65) Prior Publication Data

US 2012/0288193 A1 Nov. 15, 2012

(30) Foreign Application Priority Data

May 9, 2011 (JP) ................................. 2011-104396
May 9, 2011 (JP) ................................. 2011-104397

(51) Int. Cl.
| | | |
|---|---|---|
| G06K 9/00 | (2006.01) | |
| G06T 5/00 | (2006.01) | |
| G06T 5/20 | (2006.01) | |
| H04N 5/217 | (2011.01) | |
| H04N 5/357 | (2011.01) | |

(52) U.S. Cl.
CPC ....... *G06T 5/003* (2013.01); *G06T 2207/20012* (2013.01); *H04N 5/217* (2013.01); *G06T 5/006* (2013.01); *G06T 2207/10024* (2013.01); *H04N 5/3572* (2013.01); *G06T 5/20* (2013.01)
USPC ....................................................... 382/167

(58) Field of Classification Search
None
See application file for complete search history.

(56) References Cited

U.S. PATENT DOCUMENTS

| | | | |
|---|---|---|---|
| 6,628,329 B1* | 9/2003 | Kelly et al. .................... | 348/252 |
| 8,436,910 B2 | 5/2013 | Kinoshita | |
| 2006/0093233 A1 | 5/2006 | Kano et al. | |
| 2006/0239549 A1* | 10/2006 | Kelly et al. .................... | 382/167 |
| 2007/0115384 A1* | 5/2007 | Furukawa ...................... | 348/335 |
| 2007/0146497 A1* | 6/2007 | Yamamoto ................. | 348/222.1 |
| 2008/0080019 A1 | 4/2008 | Hayashi | |
| 2008/0129845 A1* | 6/2008 | Azuma .......................... | 348/241 |
| 2008/0174678 A1* | 7/2008 | Solomon .................. | 348/231.99 |
| 2009/0290198 A1* | 11/2009 | Hamano et al. ............... | 358/475 |
| 2010/0033604 A1* | 2/2010 | Solomon ........................ | 348/241 |
| 2010/0074520 A1* | 3/2010 | Kinoshita ...................... | 382/167 |
| 2011/0242372 A1* | 10/2011 | Kosaka .......................... | 348/242 |
| 2012/0257278 A1* | 10/2012 | Simonov et al. .............. | 359/557 |

FOREIGN PATENT DOCUMENTS

| | | |
|---|---|---|
| JP | 2006-129236 A | 5/2006 |
| JP | 2008-085697 A | 4/2008 |
| JP | 2010-045588 A | 2/2010 |
| JP | 2010-177919 A | 8/2010 |

OTHER PUBLICATIONS

Japanese Office Action cited in Japanese counterpart application No. JP2011-104396, dated Jul. 16, 2013.

* cited by examiner

*Primary Examiner* — Sean Motsinger
(74) *Attorney, Agent, or Firm* — Rossi, Kimms & McDowell LLP

(57) ABSTRACT

The image processing method includes a filter preparation step of preparing an image restoration filter to be commonly used for plural optical apparatuses having mutually different optical characteristics, and a correction information preparation step of preparing correction information varying by the optical characteristic of each of the plural optical apparatuses. The method further includes a processing step of performing an image restoration process, on an input image produced by image capturing through a specific optical apparatus of the plural optical apparatuses, using the image restoration filter and the correction information for the specific optical apparatus.

11 Claims, 10 Drawing Sheets

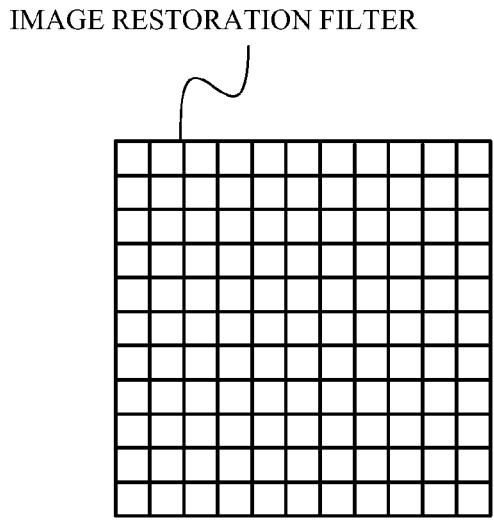
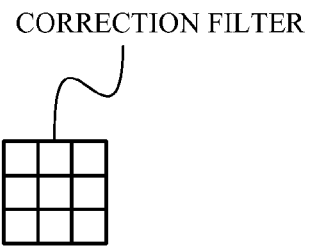
FIG. 8A
FIG. 8B
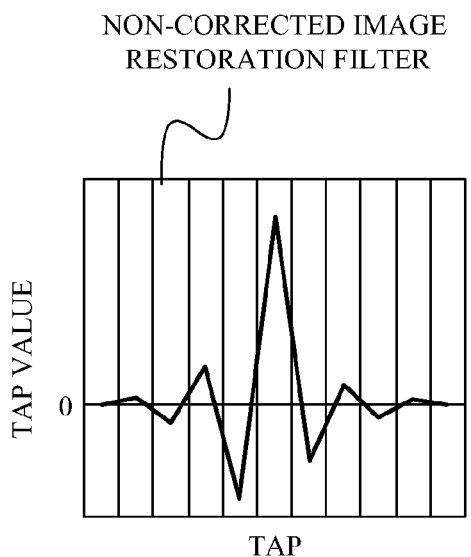
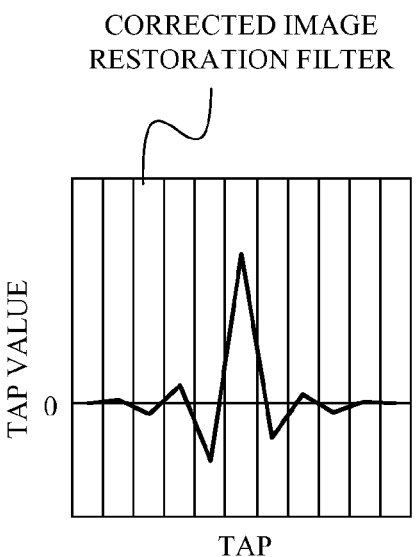
FIG. 9A
FIG. 9B

IMAGE PROCESSING METHOD FOR IMAGE RESTORATION, IMAGE PROCESSING APPARATUS AND IMAGE PICKUP APPARATUS

BACKGROUND OF THE INVENTION

The present invention relates to an image processing technique for reducing a blur component included in an image with image restoration.

Images obtained by capturing an object through optical apparatuses such as digital cameras and interchangeable lenses include a blur component as an image degradation component caused by various aberrations of an image capturing optical system (hereinafter simply referred to as "an optical system"), such as spherical aberration, comatic aberration, field curvature and astigmatism. Such a blur component is generated because a light flux emitted from one point of an object forms an image with some divergence on an image pickup surface, the light flux being normally converged at one point if there is no aberration or diffraction.

The blur component herein is optically expressed as a point spread function (PSF), which is caused by influence of the aberrations of the optical system and is different from blur caused by defocusing. Moreover, color blur in a color image caused due to longitudinal chromatic aberration, chromatic spherical aberration or chromatic comatic aberration of the optical system can be said to be a difference between blurring degrees of respective light wavelengths. In addition, horizontal color shift caused by chromatic aberration of magnification of the optical system can be said to be position shift or phase shift of color light components caused by differences of image capturing magnifications for the respective color light components.

An optical transfer function (OTF) obtained by performing Fourier transform on the point spread function (PSF) is frequency component information of aberration, which is expressed by complex number. An absolute value of the optical transfer function (OTF), that is, an amplitude component is called a modulation transfer function (MTF), and a phase component is called a phase transfer function (PTF). The MTF and PTF are respectively a frequency characteristic of the amplitude component and a frequency characteristic of the phase component of image degradation caused by the aberration. The phase component is herein shown as a phase angle by the following expression where Re(OTF) and Im(OTF) respectively represent a real part and an imaginary part of the OTF.

$$PTF = \tan^{-1}(Im(OTF)/Re(OTF))$$

Thus, the optical transfer function (OTF) of the optical system degrades the amplitude component and the phase component of the image. Respective points of the object in the degraded image are asymmetrically blurred like comatic aberration.

Moreover, the chromatic aberration of magnification is generated in an image pickup apparatus that captures, according to its spectral characteristics, color components such as R, G and B whose image-forming positions are mutually shifted due to differences of image-forming magnifications of its optical system for respective light wavelengths. Therefore, not only the shift of the image-forming positions among the color components is generated, but also shift of image-forming positions among wavelengths in each color component, that is, image spread due to the phase shift is generated.

There is known a method that corrects (reduces) degradation in amplitude (MTF) and degradation in phase (PTF) using information on an optical transfer function (OTF) of an optical system. This method is called image restoration or image reconstruction. Hereinafter, a process that corrects such image degradation using the optical transfer function (OTF) of the optical system is referred to as "an image restoration process" or more simply as "a restoration process".

Actually manufactured optical apparatuses have individual variabilities in lens shape, lens holding mechanism and lens driving mechanism caused by manufacturing errors. Such an individual variability influences the optical transfer function (OTF) of the optical apparatus. Thus, in order to more accurately perform the image restoration process according also to the manufacturing errors, it is desirable to produce an image restoration filter for the image restoration process based on the optical transfer function (OTF) of each individual of the optical apparatuses.

Japanese Patent Laid-Open No. 2008-85697 discloses an image restoration method using, in an actual image restoration process, a specific image restoration filter that could provide a certain image restoration evaluation level for a predetermined degraded image among plural prestored image restoration filters. This method enables image restoration according to the above-mentioned individual variabilities of the optical apparatuses caused by the manufacturing errors.

However, the method disclosed in Japanese Patent Laid-Open No. 2008-85697 requires trials of the image restoration processes using the plural image restoration filters, which needs a long process time until a restored image is finally output.

Moreover, a method for enabling the image restoration according to the individual variabilities can be employed, as a different method from the method disclosed in Japanese Patent Laid-Open No. 2008-85697, which measures the optical transfer function of each individual of the optical apparatuses and prepares the image restoration filters for the respective individuals. However, preparing the image restoration filters for the respective individuals of the optical apparatuses in one system performing the image restoration process on those individuals extremely increases an amount of prepared data, which is unrealistic. The image restoration filter is a filter to ideally correct spread of the PSF to one point and therefore is constituted by a two-dimensional and asymmetric data grope, which easily increases the prepared data amount.

BRIEF SUMMARY OF THE INVENTION

The present invention provides an image processing method, an image processing apparatus and an image pickup apparatus capable of providing a good restored image according to the individual variabilities of the optical apparatuses while suppressing the increases of the process time and prepared data amount.

The present invention provides as an aspect thereof an image processing method including a filter preparation step of preparing an image restoration filter to be commonly used for plural optical apparatuses having mutually different optical characteristics, a correction information preparation step of preparing correction information varying by the optical characteristic of each of the plural optical apparatuses, and a processing step of performing an image restoration process, on an input image produced by image capturing through a specific optical apparatus of the plural optical apparatuses, using the image restoration filter and the correction information for the specific optical apparatus.

The present invention provides as another aspect thereof an image processing apparatus including a memory configured to store an image restoration filter to be commonly used for plural optical apparatuses having mutually different optical characteristics, and an image restoration part configured to acquire correction information varying by the optical characteristic of each of the plural optical apparatuses and configured to perform an image restoration process, on an input image produced by image capturing through a specific optical apparatus of the plural optical apparatuses, using the image restoration filter and the correction information for the specific optical apparatus.

The present invention provides as yet another aspect thereof an image pickup apparatus including an image capturing system and the above image processing apparatus.

The present invention provides as still yet another aspect thereof a storage medium in which an image processing program to be executed by a computer is stored. The image processing program includes a filter preparation step of preparing an image restoration filter to be commonly used for plural optical apparatuses having mutually different optical characteristics, a correction information preparation step of preparing correction information varying by the optical characteristic of each of the plural optical apparatuses, and a processing step of performing an image restoration process, on an input image produced by image capturing through a specific optical apparatus of the plural optical apparatuses, using the image restoration filter and the correction information for the specific optical apparatus.

Other aspects of the present invention will be apparent from the embodiments described below with reference to the drawings.

BRIEF DESCRIPTION OF THE DRAWINGS

FIGS. 8A and 8B show correction of the image restoration filter by using a correction filter in Embodiment 1.

FIGS. 9A and 9B show a non-corrected image restoration filter and a corrected image restoration filter in Embodiment 1.

DETAILED DESCRIPTION OF THE EMBODIMENTS

Figure 1:
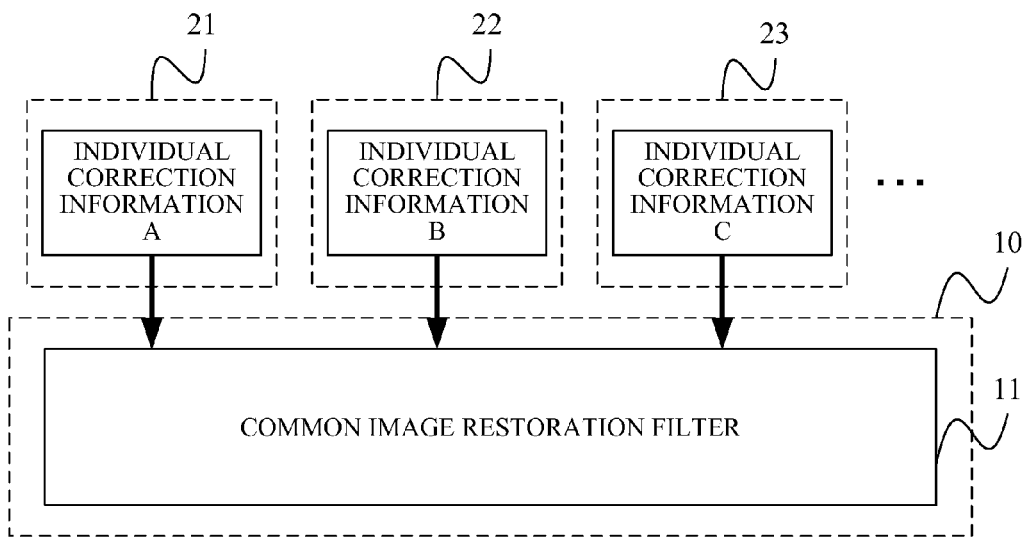
FIG. 1 shows a relationship of individual correction information (A, B and C) and a common image restoration filter in an image processing method that is Embodiment 1 of the present invention.

Exemplary embodiments of the present invention will be described below with reference to the accompanied drawings.

First of all, prior to description of specific embodiments, description will be made of definition of terms to be used in the embodiments and an image restoration process performed in the embodiments.

"Input Image"

The input image is an image produced by image capturing. Specifically, the input image is a digital image produced from an image pickup signal obtained by photoelectric conversion of an object image by an image sensor (image pickup element) such as a CCD sensor or a CMOS sensor, the object image being formed by an image capturing optical system (hereinafter simply referred to as "an optical system"). The input image is degraded according to aberrations of the optical system including lenses and various optical filters, that is, an optical transfer function (OTF) of the optical system. The optical system may be constituted by, other than the lenses, reflective surfaces such as mirrors each having curvature.

An image processing method described in the embodiments can be applied also to an apparatus that produces the input image by image capturing without using the optical system. For example, a scanner (image reader) and an X-ray camera each performing image capturing with an image sensor in closely contact with an object surface have no optical system, but produce an image by using an image pickup signal from the image sensor. And, the produced image includes, not a degradation component generated by their optical system, but a degradation component according to a transfer function of their image capturing system, which corresponds to the optical transfer function. Therefore, the image processing method described in the embodiments can be applied to an apparatus for which an image restoration filter is produced based on the transfer function of its image capturing system, even having no optical system. Thus, the optical transfer function (OTF) in the embodiments includes the transfer function of the image capturing system.

Moreover, the input image has information on color components such as RGB. The color components can be also expressed by, other than the RGB, an optionally selected one of general color spaces such as LCH (lightness, chroma and hue), YCbCr, XYZ, Lab, Yuv and JCh, or can be expressed by color temperature.

Furthermore, the input image can be provided with information on an image capturing condition including a focal length of the optical system, an aperture value thereof, an image capturing distance (object distance) and the like, and with various correction information to be used for correction of the input image. When performing the correction of the input image in an image processing apparatus that receives the input image from the image pickup apparatus, it is desirable to add the correction information as additional information to the input image. The image processing apparatus can receive the correction information from the image pickup apparatus through wire communication, wireless communication and a storage medium detachably attachable thereto.

"Image Restoration Process" and "Image Restoration Filter"

The outline of the image restoration process is as follows. When g(x,y) represents a degraded image (input image), f(x, y) represents a non-degraded original image, h(x,y) represents a point spread function (PSF) that forms a Fourier pair with the optical transfer function (OTF), * represents convolution, and (x,y) represents coordinates on the image, the following expression is established:

g(x,y)=h(x,y)*f(x,y).

Converting the above expression into a form of a two-dimensional frequency surface through Fourier transform provides the following expression of a form of a product for each frequency:

G(u,v)=H(u,v)·F(u,v)

where H represents a result of Fourier transform of the point spread function (PSF), in other words, the optical transfer function (OTF), G and F respectively represent results of Fourier transform of g and h, and (u,v) represents coordinates on the two-dimensional frequency surface, in other words, a frequency.

Dividing both sides of the above expression by H as below provides the original image from the degraded image:

G(u,v)/H(u,v)=F(u,v).

Returning this F(u,v) by inverse Fourier transform to a real surface provides a restored image equivalent to the original image f(x, y).

When R represents a result of inverse Fourier transform of $H^{-1}$, performing a convolution process for an image in the real surface as represented by the following expression also enables provision of the original image:

g(x,y)*R(x,y)=f(x,y).

This R(x,y) in the above expression is the image restoration filter. When the image is a two-dimensional image, the image restoration filter is generally also a two-dimensional filter having taps (cells) corresponding to pixels of the image. Moreover, increase of the number of the taps (cells) in the image restoration filter generally improves image restoration accuracy, so that a realizable number of the taps is set depending on requested image quality, image processing capability, aberration characteristics and the like. Since the image restoration filter needs to reflect at least the aberration characteristics, the image restoration filter is different from a conventional edge enhancement filter (high-pass filter) having about three taps in each of horizontal and vertical directions. Since the image restoration filter is produced based on the optical transfer function (OTF), degradation of amplitude and phase components (described above) can be highly accurately corrected.

Since a real image includes a noise component, using an image restoration filter produced from the complete inverse number of the optical transfer function (OTF) as described above amplifies the noise component together with the degraded image, which generally makes it impossible to provide a good restored image. This is because such an image restoration filter raises an MTF (modulation transfer function) of the optical system, which corresponds to the amplitude component of the image, to 1 over an entire frequency range in a state where amplitude of the noise component is added to the amplitude component of the image. Although the MTF (amplitude component) degraded by the optical system is returned to 1, power spectrum of the noise component is simultaneously raised, which results in amplification of the noise component in accordance with a degree of raising of the MTF, that is, a restoration gain.

Therefore, the noise component makes it impossible to provide a good image for appreciation. Such raising of the noise component is shown by the following expressions where N represents the noise component:

G(u,v)=H(u,v)·F(u,v)+N(u,v)

G(u,v)/H(u,v)=F(u,v)+N(u,v)/H(u,v)

As a method for solving such a problem, there is known, for example, a Wiener filter represented by the following expression (1), which suppresses the restoration gain on a high frequency side of the image according to an intensity ratio (SNR) of an image signal and a noise signal.

$$M(u, v) = \frac{1}{H(u, v)} \frac{|H(u, v)|^2}{|H(u, v)|^2 + SNR^2} \quad (1)$$

In the above expression (1), M(u,v) represents a frequency characteristic of the Wiener filter, and |H(u,v)| represents an absolute value (MTF) of the optical transfer function (OTF). This method decreases the restoration gain as the MTF is lower, in other words, increases the restoration gain as the MTF is higher. The MTF of the optical system is generally high on a low frequency side range and low on a high frequency side range, so that the method resultantly suppresses the restoration gain on the high frequency side range of the image.

Figure 2:
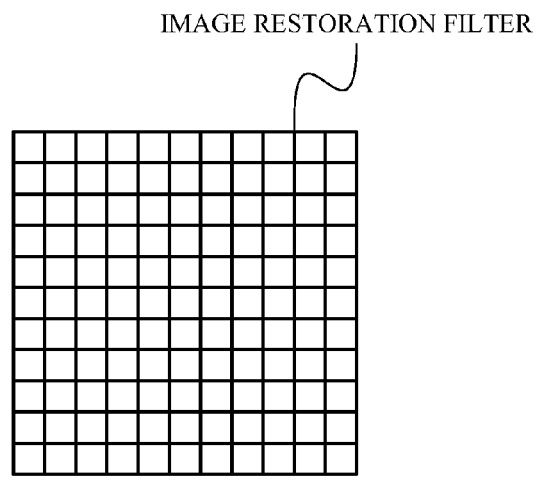
FIG. 2 shows the image restoration filter used in the image processing method of Embodiment 1.
Figure 3:
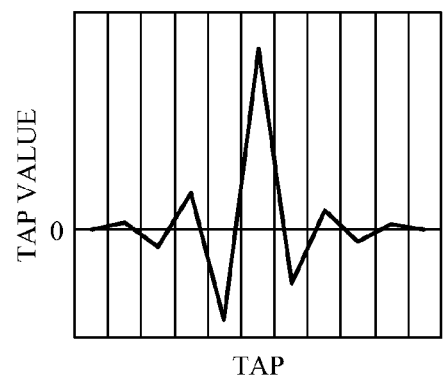
FIG. 3 shows tap values of the image restoration filter shown in FIG. 2.

An example of the image restoration filter is shown in FIG. 2. For the image restoration filter, the number of the taps (cells), that is, a kernel size is decided according to aberration characteristics and demanded restoration accuracy. The image restoration filter shown in FIG. 2 is a two-dimensional filter having 11×11 cells. Each tap (cell) corresponds to one pixel of the image. Although FIG. 2 omits values in the respective taps, FIG. 3 shows one cross section of this image restoration filter. A distribution of the values (coefficient values) of the respective taps of the image restoration filter plays a role to return signal values (PSF) spatially spread due to the aberration to, ideally, one point.

A convolution process is performed by applying each tap of such an image restoration filter to each pixel of the degraded image. In the convolution process, in order to improve the signal value of a certain pixel in the degraded image, that pixel is matched to a center tap of the image restoration filter. Then, a product of the signal value of the degraded image and the coefficient value of the filter is calculated for each corresponding pair of the pixel in the degraded image and the tap of the filter, and the signal value of the pixel corresponding to the center tap of the filter is replaced by a total sum of the products.

Figures 4A, 4B:
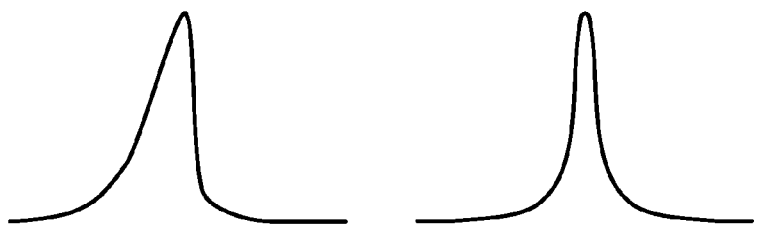
FIGS. 4A and 4B show correction of a point image in the image processing method of Embodiment 1.
Figure 5A:
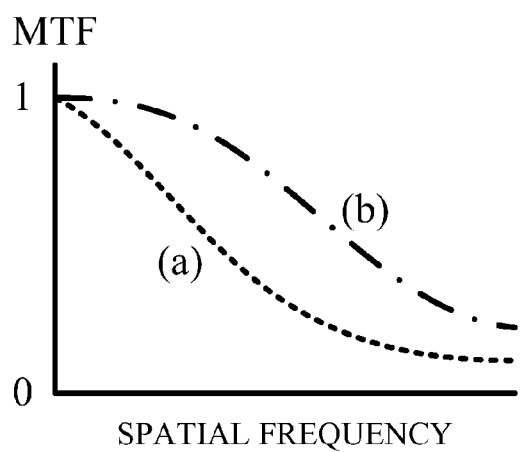
FIGS. 5A and 5B show an MTF and a PTF in the image processing method of Embodiment 1.
Figure 5B:
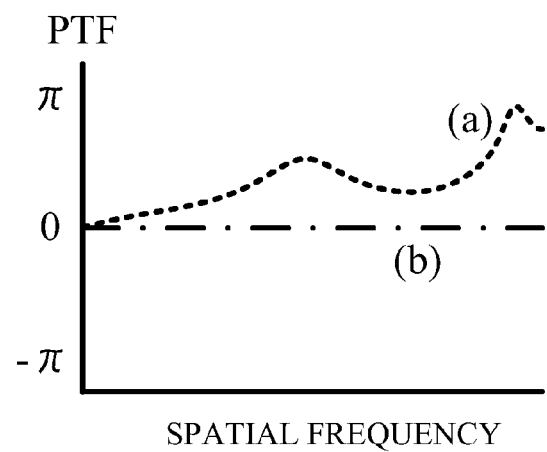

Characteristics of the image restoration in a real space and a frequency space will be described with reference to FIGS. 4A, 4B, 5A and 5B. FIG. 4A shows a PSF (point spread function) before the image restoration, and FIG. 4B shows a PSF after the image restoration. FIG. 5A shows (a) an MTF before the image resrotation and (b) an MTF after the image restoration. FIG. 5B shows (a) a PTF (phase transfer function) before the image restoration and (b) a PTF after the image restoration. The PSF before the image restoration asymmetrically spreads, and the PTF is not zero due to the asymmetry.

The image restoration process amplifies the MTF and corrects the PTF to zero, so that the PSF after the image restoration has a symmetric shape and is sharpened.

This image restoration filter can be obtained by the inverse Fourier transform of a function designed on the basis of an inverse function of the optical transfer function (OTF) of the optical system. The image restoration filter used in the embodiments can be arbitrarily changed, and for example, the Wiener filter may be used as the image restoration filter. In the case of using the Wiener filter, the image restoration filter can be produced by the inverse Fourier transform of the expression (1).

The embodiments use such an image restoration filter as a common filter for plural optical apparatuses having individual variabilities due to manufacturing errors though being manufactured as apparatuses of a same model. However, the embodiments prepare, as the common image restoration filter, plural image restoration filters for plural representative image capturing conditions (such as focal lengths of the optical system, aperture values thereof and image capturing distances) in these optical apparatuses.

"Individual Correction Information"

The individual correction information is information showing, for example, partial blurring in each of optical apparatuses having individual variabilities due to the manufacturing errors. The partial blurring means variation of image-forming states at positions (or in areas) on an image surface, which is caused by loss of rotational symmetry of a design optical characteristic of the optical system on the image surface (that is, design image-forming characteristics for positions on the image surface), the loss of the rotational symmetry resulting from mutual decentering of optical elements such as lenses constituting the optical system due to the manufacturing errors. If there is no manufacturing error, the image-forming characteristics of the optical system have the rotational symmetry. The image surface of the optical system can be replaced with a light-receiving surface of the image sensor or the input image. The positions on the image surface can be replaced with image heights.

Figure 6:
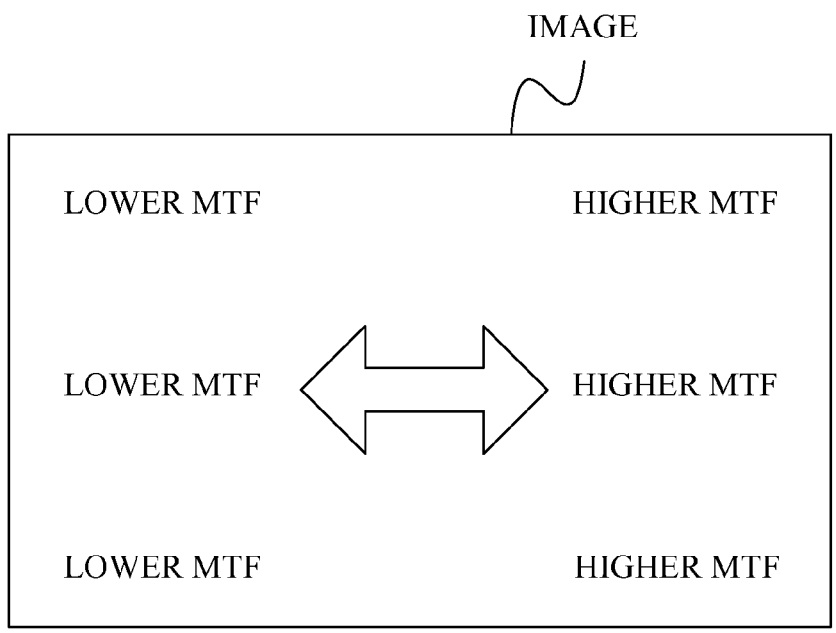
FIG. 6 shows influences of manufacturing errors on an optical characteristic.

FIG. 6 shows an example of the partial blurring. As compared with a reference image-forming characteristic (MTF) in the case where there is no manufacturing error, the partial blurring generates a lower MTF decreasing sharpness on the left side of the image, and generates a higher MTF increasing sharpness on the right side of the image. The individual correction information is information showing such image-forming characteristics mutually different for the positions on the image (that is, the partial blurring), and in other words, information varying by the optical characteristic (image-forming characteristics) of each individual of the optical apparatuses. In further other words, the individual correction information for one optical apparatus is different from that for another optical apparatus having a different optical characteristic from that of the one optical apparatus.

The individual correction information may be table data showing a relationship between the positions on the image surface (or on the image sensor's light-receiving surface, or in the image) and the image-forming characteristics, or may be a function (and coefficients thereof) expressing the image-forming characteristics for the positions on the image surface. Storing such a function as the individual correction information enables reduction of a stored data amount as compared with a case of storing the table data.

The individual correction information for each individual of the optical apparatuses can be acquired by individually measuring the optical characteristic of each optical apparatus at the time of its manufacturing. The individual correction information may be stored in all the manufactured optical apparatuses, or may be stored in selected individuals thereof.

The individual correction information can be produced as information showing how a real image surface is transformed with respect to an ideal image surface, which makes it possible to more easily produce the individual correction information than a case of measuring the optical transfer function (OTF) at each position on the image.

When the image-forming characteristics are different among color components (that is, among color lights) constituting the image, it is desirable to produce the individual correction information as information varying by each of the color components. Moreover, in order to control a degree of the image restoration (hereinafter simply referred to as "a restoration degree") that shows a level of image restoration effect, according to pixel feature information (described later) in the image, the individual correction information may be changed according to the pixel feature information.

The individual correction information can be used for various cases where the image-forming characteristics for the positions on the image are mutually different due to not only the partial blurring but also all factors relating to the manufacturing errors.

Embodiment 1

FIG. 1 shows a relationship between an image restoration filter and individual correction information in an image restoration process performed by using an image processing method that is a first embodiment (Embodiment 1) of the present invention. Optical apparatuses 21, 22, 23, ..., such as image pickup apparatuses (digital cameras, video cameras and the like) or interchangeable lenses detachably attachable to the image pickup apparatus, are manufactured as apparatuses of a same model, but have individual variabilities due to manufacturing errors. An image produced by image capturing through each optical apparatus is sent as an input image to an image processing apparatus 10. The image processing apparatus 10 is constituted by a computer in which an image processing program that is a computer program for causing the computer to execute the image restoration process is installed. The image processing apparatus 10 performs the image restoration process on the input image to output a resultant image, that is, a restored image.

The image processing apparatus 10 stores, in its internal memory 11, plural image restoration filters each being a common image restoration filter for the optical apparatuses 21, 22, 23, ... and respectively corresponding to the representative image capturing conditions, as described above. These common image restoration filters can be produced on the basis of, for example, design optical transfer functions (OTFs) of optical systems provided in the optical apparatuses 21, 22, 23, ....

On the other hand, the optical apparatuses 21, 22, 23, ... respectively store, in their internal memories (not shown), individual correction information A, individual correction information B, individual correction information C, ..., which are mutually different for the respective individuals of the optical apparatuses 21, 22, 23, ....

Figure 7:
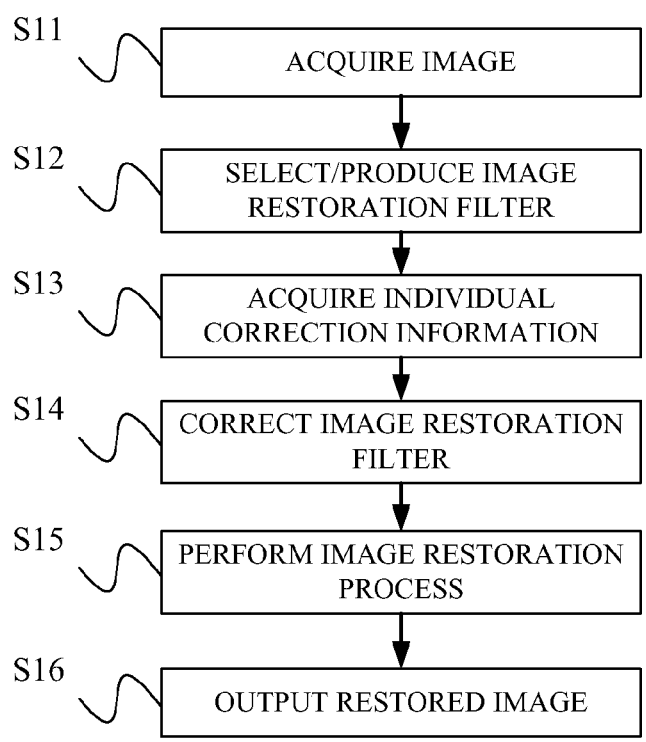
FIG. 7 is a flowchart showing an image restoration process using the image processing method of Embodiment 1.

FIG. 7 is a flowchart showing procedures of the image restoration process in this embodiment. The optical apparatuses are lens-integrated image pickup apparatuses or image pickup apparatuses to which an interchangeable lens is attached. The image processing apparatus 10 as an image restoration part acquires at step S11 the input image on which the image restoration process will be performed from one of the optical apparatuses 21, 22, 23, ..., through wire communication, wireless communication or a detachably attachable storage medium. In the following description, the optical apparatus from which the image processing apparatus 10 acquires the input image is hereinafter referred to as "a specific optical apparatus".

Next, at step S12, the image processing apparatus 10 selects from or produces by using the plural image restoration filters stored in the internal memory 11, one image restoration filter corresponding to the image capturing condition for production (capturing) of the input image by the specific optical apparatus. The image restoration filter selected or produced at this step is hereinafter referred to as "a use image restoration filter". The image processing apparatus 10 may acquire information on the image capturing condition directly from the specific optical apparatus, or may acquire it from the image capturing condition information added to the input image.

The image processing apparatus 10 may select, as the use image restoration filter, from the plural image restoration filters stored in the internal memory 11, one filter for one image capturing condition corresponding to or near an actual image capturing condition. The image processing apparatus 10 may produce the use image restoration filter by correcting one or two image restoration filters for one or two representative image capturing conditions. For example, the image processing apparatus 10 may produce the use image restoration filter by performing an interpolation process on two image restoration filters for two representative image capturing conditions near the actual image capturing condition.

Even if the optical apparatuses 21, 22, 23, . . . have no individual variability due to the manufacturing errors, since the image-forming characteristics, that is, the optical transfer functions (OTFs) of the optical system of each optical apparatus are mutually different for positions (or areas) on the image surface, that is, in the input image, it is desirable to change the use image restoration filter for the positions (or the areas) in the input image.

Next, at step S13, the image processing apparatus 10 acquires the above-mentioned individual correction information from the specific optical apparatus to store it in the internal memory 11.

Next, at step S14, the image processing apparatus 10 produces a correction filter from the individual correction information stored in the internal memory 11 at step S13, and then corrects the use image restoration filter stored in the internal memory 11 at step S12 by using the correction filter.

FIG. 8A shows an example of the image restoration filter before correction using the correction filter (this image restoration filter is hereinafter referred to as "a non-corrected image restoration filter). FIG. 8B shows an example of the correction filter produced according to the individual correction information. Their coefficient values are omitted. A high-pass filter or a low-pass filter can be used as the correction filter.

Since the image restoration filter is produced on the basis of the optical transfer function (OTF), the image restoration filter has a comparatively large number of taps, such as 11×11 taps as shown in FIG. 2. On the other hand, since the correction filter mainly has a function of increasing or decreasing gains of the image restoration filter, the correction filter has a small number of taps, such as 3×3 taps, that is, a small data amount to correct the image restoration filter.

Performing convolution of the correction filter on the image restoration filter enables correction of a characteristic of the image restoration filter. FIGS. 9A and 9B show change of coefficient values (tap values) of the image restoration filter caused by the correction in a same cross section of the image restoration filter. FIG. 9A shows the coefficient values of the non-corrected image restoration filter, and FIG. 9B shows the coefficient values of the image restoration filter after the correction (this image restoration filter is hereinafter referred to as "a corrected image restoration filter").

Figure 10:
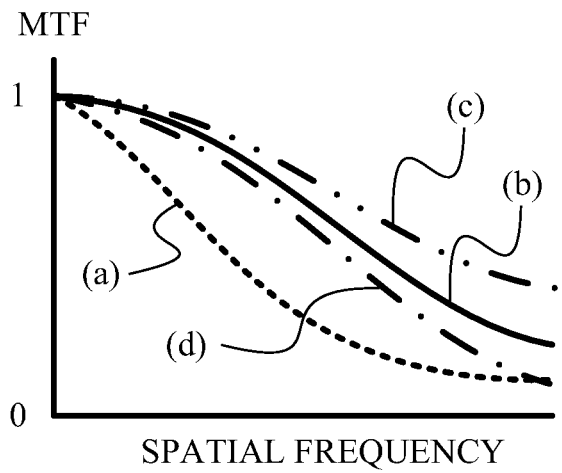
FIG. 10 shows MTFs of images restored by using the non-corrected and corrected image restoration filters in Embodiment 1.

Moreover, FIG. 10 shows a relationship between presence or absence of the correction of the image restoration filter using the correction filter and change of an MTF obtained by the image restoration process. In FIG. 10, a graph (a) shows an MTF of the input image before the image restoration process, and a graph (b) shows an MTF of an image after the image restoration process using the image restoration filter (non-corrected image restoration filter) not corrected by the correction filter. Moreover, in FIG. 10, a graph (c) shows an MTF of an image after the image restoration process using the image restoration filter (corrected image restoration filter) corrected by a high-pass filter as the correction filter, and a graph (d) shows an MTF of an image after the image restoration process using the image restoration filter (corrected image restoration filter) corrected by a low-pass filter as the correction filter. Thus, using the image restoration filter corrected on the basis of the individual correction information acquired from the specific optical apparatus enables restoration of the MTF of the image produced by the specific optical apparatus, which has an individual variability with respect to other optical apparatuses, according to that individual variability.

Figure 11:
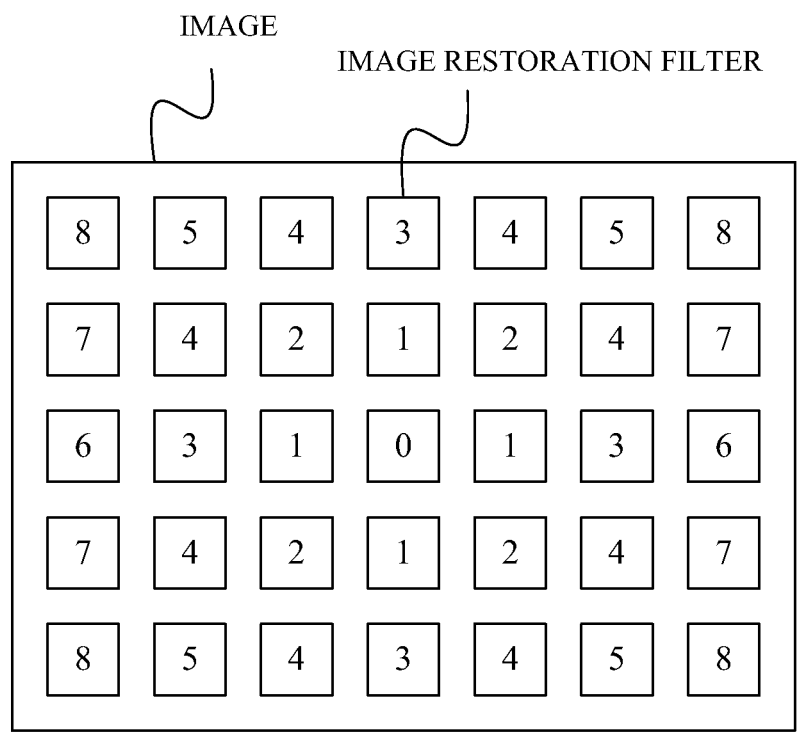
FIG. 11 shows an example of the non-corrected image restoration filter in Embodiment 1.

FIG. 11 shows an example of the plural image restoration filters discretely prepared beforehand for the plural positions in the input image and stored in the internal memory 11. Image restoration filters to which a same number (1-8) is added are mutually same image restoration filters. In FIG. 11, such mutually same image restoration filters are applied to the input image so as to have rotational symmetry about a center of the input image, the rotational symmetry corresponding to rotational symmetry of the image-forming characteristics of the optical system. However, in the mutually same image restoration filters, directions thereof are mutually different.

Figure 12:
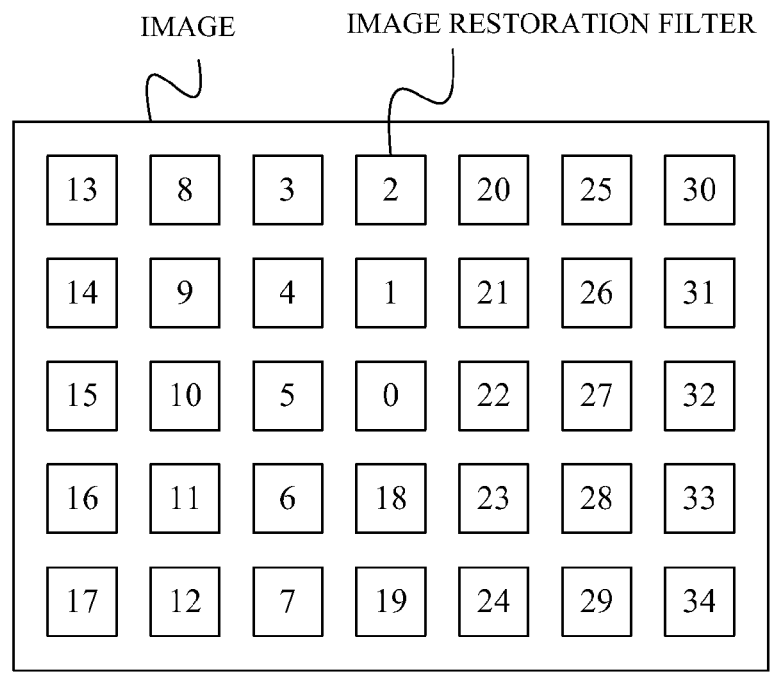
FIG. 12 shows an example of the corrected image restoration filter in Embodiment 1.

FIG. 12 shows an example of the corrected image restoration filters produced by correcting the image restoration filters shown in FIG. 11 on the basis of the individual correction information acquired from the specific optical apparatus, that is, by performing the convolution of the correction filter on the image restoration filters. The corrected image restoration filters applied to the respective positions in the input image are mutually different filters (mutually different numbers are added thereto). Thus, the plural image restoration filters corrected on the basis of the individual correction information reflect the differences among the image-forming characteristics for the respective positions in the input image due to the manufacturing errors. How the image restoration filters are corrected according to the positions in the input image depends on a generation situation of the manufacturing errors.

Furthermore, the restoration degree, that is, the individual correction information may be changed according to a change amount of a pixel value in the input image, in other words, the pixel feature information. The pixel feature information shows a flat portion where pixel values (signal values of pixels) of the image change little, an edged portion where the pixel values largely change, and a pixel's luminance saturation degree.

Next, at step S15, the image processing apparatus 10 performs the image restoration process using the corrected image restoration filters on the input image. Then, at step S16, the image processing apparatus 10 outputs a restored image that is a resultant image obtained by the image restoration process.

This embodiment prepares the image restoration filter whose data amount is large as a common filter for the plural optical apparatuses having the individual variabilities, and corrects the common image restoration filter by using the individual correction information to perform a proper image restoration process for each of the optical apparatuses having the mutually different image-forming characteristics. Thus, this embodiment enables provision of a good restored image reflecting the individual variability of the optical apparatus while suppressing increase of process time and increase of data amount.

Providing the image processing apparatus 10 in a lens-interchangeable image pickup apparatus when the optical apparatuses 21, 22, 23, . . . are interchangeable lenses makes it possible to cause the image pickup apparatus to output good restored images with respect to the individual variabilities of the optical apparatuses 21, 22, 23, . . . . This case is also an alternative embodiment of the present invention.

Embodiment 2

Figure 13:
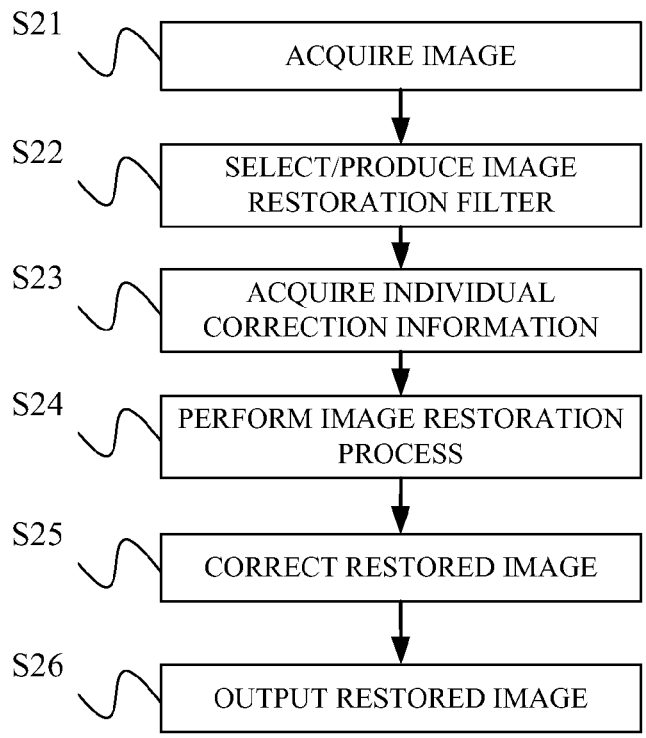
FIG. 13 is a flowchart showing an image restoration process using an image processing method that is Embodiment 2 of the present invention.

FIG. 13 is a flowchart showing procedures of an image restoration process using an image processing method that is a second embodiment (Embodiment 2) of the present invention.

An image processing apparatus 10 acquires at step S21 an input image on which the image restoration process will be performed from a specific optical apparatus of the optical apparatuses 21, 22, 23, . . . , shown in FIG. 1 through wire communication, wireless communication or a detachably attachable storage medium.

Next, at step S22, the image processing apparatus 10 selects from or produces by using the plural image restoration filters stored in the internal memory 11, one image restoration filter (use image restoration filter) corresponding to the image capturing condition of the input image by the specific optical apparatus, as well as at step S12 in Embodiment 1. Then, the image processing apparatus 10 stores the use image restoration filter to the internal memory 11.

Next, at step S23, the image processing apparatus 10 acquires individual correction information from the specific optical apparatus to store it in the internal memory 11.

Next, at step S24, the image processing apparatus 10 performs the image restoration process using the use image restoration filter stored in the internal memory 11 at step S22 on the input image received from the specific optical apparatus at step S21.

Next, at step S25, the image processing apparatus 10 produces a correction filter from the individual correction information stored in the internal memory 11 at step S23, and corrects a restored image, which is a resultant image obtained by the image restoration process, by using the correction filter. Then, at step S26, the image processing apparatus 10 outputs the corrected restored image.

This embodiment prepares the image restoration filter whose data amount is large as a common filter for the plural optical apparatuses having the individual variabilities, and corrects, by using the individual correction information, the restored imaged on which the image restoration process has been performed by using the common image restoration filter. This embodiment thereby performs a proper image restoration process for each of the optical apparatuses having the mutually different image-forming characteristics. Thus, this embodiment enables, as well as Embodiment 1, provision of a good restored image reflecting the individual variability of the optical apparatus while suppressing increase of process time and increase of data amount.

Embodiment 3

Figure 14:
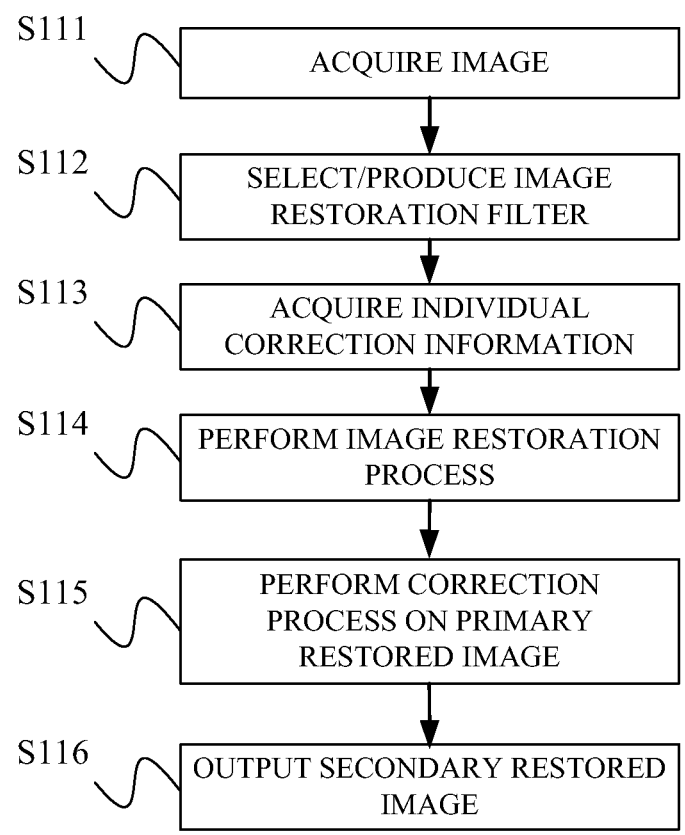
FIG. 14 is a flowchart showing an image restoration process using an image processing method that is Embodiment 3 of the present invention.

FIG. 14 is a flowchart showing procedures of an image restoration process in this embodiment. Optical apparatuses in this embodiment are lens-integrated image pickup apparatuses or image pickup apparatuses to which an interchangeable lens is attached. An image processing apparatus 10 acquires at step S111 an input image on which the image restoration process will be performed from one of the optical apparatuses 21, 22, 23, . . . , through wire communication, wireless communication or a detachably attachable storage medium. In the following description, the one optical apparatus from which the image processing apparatus 10 acquires the input image is hereinafter referred to as "a specific optical apparatus".

Next, at step S112, the image processing apparatus 10 selects from or produces by using the plural image restoration filters stored in the internal memory 11, one image restoration filter corresponding to an image capturing condition for production (capturing) of the input image by the specific optical apparatus. The image restoration filter selected or produced at this step is hereinafter referred to as "a use image restoration filter". The image processing apparatus 10 may acquire information on the image capturing condition directly from the specific optical apparatus, or may acquire it from the image capturing condition information added to the input image.

The image processing apparatus 10 may select, as the use image restoration filter, from the plural image restoration filters stored in the internal memory 11, one filter for one image capturing condition corresponding to or near an actual image capturing condition. The image processing apparatus 10 may produce the use image restoration filter by correcting one or two image restoration filters for one or two representative image capturing conditions. For example, the image processing apparatus 10 may produce the use image restoration filter by performing an interpolation process on two image restoration filters for two representative image capturing conditions near the actual image capturing condition.

Even if the optical apparatuses 21, 22, 23, . . . have no individual variability due to the manufacturing errors, since the image-forming characteristics, that is, the optical transfer functions (OTFs) of the optical system of each optical apparatus are mutually different for positions (or areas) on an image surface, that is, in the input image, it is desirable to change the use image restoration filter for the positions (or the areas) in the input image.

Next, at step S113, the image processing apparatus 10 acquires individual correction information, which has been described in Embodiment 1, from the specific optical apparatus to store it in the internal memory 11.

Next, at step S114, the image processing apparatus 10 performs the image restoration process on the input image by using the use image restoration filter selected or produced at step S112 to produce a primary restored image (first restored image) as a resultant image.

Next, at step S115, the image processing apparatus 10 performs a correction process on the primary restored image by using the individual correction information for the specific optical apparatus stored in the internal memory 11 at step S113 to produce a secondary restored image (second restored image) as a resultant image. Then, at step S116, the image processing apparatus 10 outputs the secondary restored image.

Figure 15:
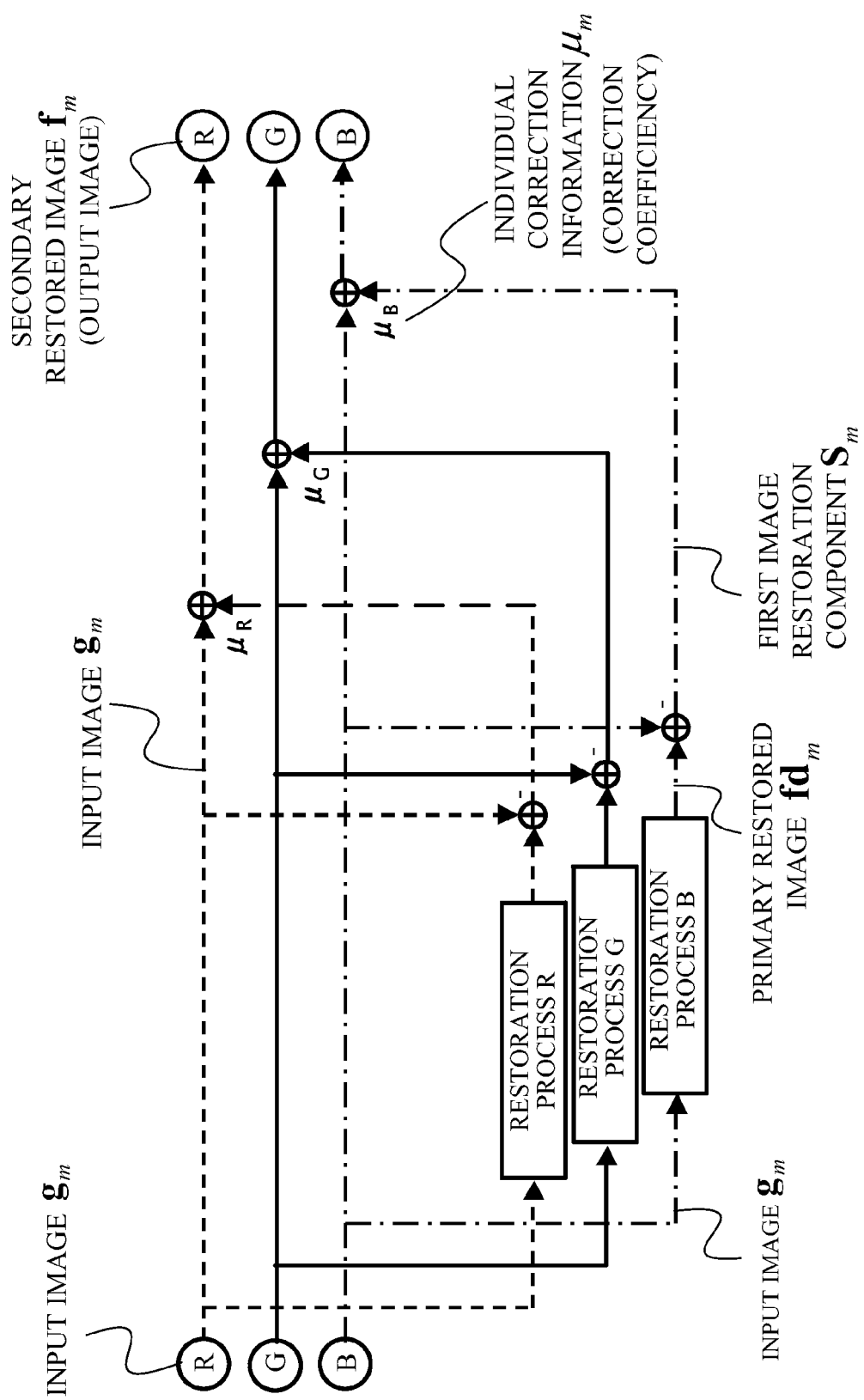
FIG. 15 shows the image restoration process in Embodiment 3.

FIG. 15 shows the correction process performed on the primary restored image at step S115. In FIG. 15, reference character m shows a color component of the image. For example, when an image A ("A" is not shown in the figure) is constituted by three color components of R, G and B, $A_m$ shows AR, AG and AB that are the R, G and B components of the image A. The image A is the input image g, the primary restored image fd, a restoration image component S and the secondary restored image f, and more specifically shows a signal value of each pixel.

The image processing apparatus 10 performs the image restoration process on the input image $g_m$ using the use image restoration filter to produce the primary restored image $fd_m$. As the use image restoration filter, mutually different filters are prepared for the R, G and B components of the input image $g_m$.

Then, the image processing apparatus 10 subtracts, as shown by the following expression (2), from signal values of respective pixels in the primary restored image $fd_m$, signal values of corresponding pixels in the original input image $g_m$ to acquire a first image restoration component $S_m$ for each pixel. This first image restoration component $S_m$ corresponds to a difference between the images (pixel signal values) before and after the image restoration process, and shows an aberration component included in the original input image.

$$S_m = fd_m - g_m \quad (2)$$

Next, the image processing apparatus 10 multiplies, for each pixel, the first image restoration component $S_m$ by a correction coefficient $\mu_m$ produced based on the individual correction information to produce a second image restoration component ($S_m \times \mu_m$). Since image-forming characteristics of the optical system for the color components (that is, for color lights), the individual correction information is prepared as information varying by each of the color components. Then, the image processing apparatus 10 combines (adds), for each pixel, the secondary image restoration component ($S_m \times \mu_m$) and the input image $g_m$ to generate the secondary restored image $f_m$. The production of the secondary restored image $f_m$ can be expressed by the following expression (3):

$$f_m = g_m + \mu_m S_m \quad (3)$$

When $\mu_m$ is equal to 0 ($\mu_m = 0$), the input image $g_m$ is obtained, and when $\mu_m$ is equal to 1 ($\mu_m = 1$), the primary restored image $g_m$ is obtained. In other words, the correction coefficient $\mu_m$ is a coefficient to control how much the aberration is removed from the input image. Thus, when the primary restored image is excessively restored, $\mu_m$ smaller than 1 ($\mu_m < 1$) can reduce the restoration degree, and when the primary restored image is insufficiently restored, $\mu_m$ greater than 1 ($\mu_m > 1$) can increase the restoration degree.

Figure 16:
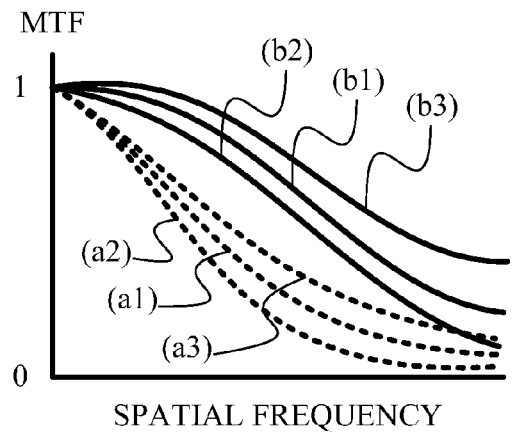
FIG. 16 shows MTFs of images restored by using non-corrected and corrected image restoration filters in Embodiment 3.

Description will be made of control of the restoration degree with reference to FIG. 16. In FIG. 16, a graph (a1) shows an MTF of an input image obtained by image capturing through an optical apparatus having no manufacturing error, and a graph (b1) shows a proper MTF acquired by performing the image restoration process on the input image whose MTF is shown by the graph (a1).

Moreover, graphs (a2) and (a3) respectively show decreased and increased MTFs in left and right areas in an input image due to partial blurring (described in Embodiment 1) or the like. Performing the image restoration process using a common image restoration filter (use image restoration filter) that is not produced according to the individual variability due to the manufacturing error causes an insufficient restoration (b2) and an excessive restoration (b3), as compared with an MTF shown by a graph (b1). Thus, correcting the first image restoration component obtained by the image restoration process using the individual correction information (correction coefficient) makes it possible to control the restoration degree such that the MTFs shown by the graphs (b2) and (b3) come close to the MTF shown by the graph (b1).

Figure 17A:
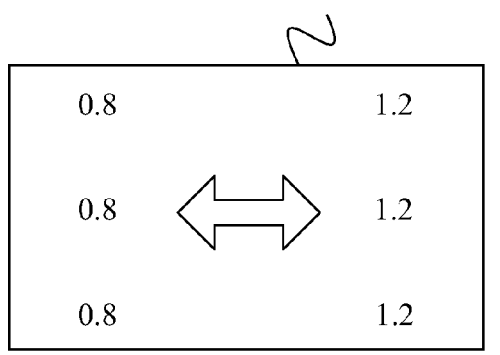
FIGS. 17A to 17C show MTFs of a primary restored image, correction coefficients and a secondary restored image in Embodiment 3.

Description will be made of the correction coefficient $\mu_m$ produced based on the individual correction information with reference to FIGS. 17A to 17C. FIG. 17A shows an MTF of a primary restored image produced by performing the image restoration process on an input image obtained through an optical apparatus (specific optical apparatus) having a manufacturing error when an MTF of a primary restored image produced by performing the image restoration process on an input image obtained through an optical apparatus having no manufacturing error is defined as 1 (target value). The partial blurring of the input image causes an insufficient restoration in a left area in the primary restored image and an excessive restoration in a right area therein.

Figure 17B:
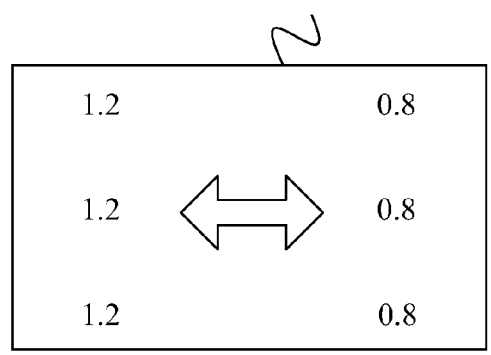
Figure 17C:
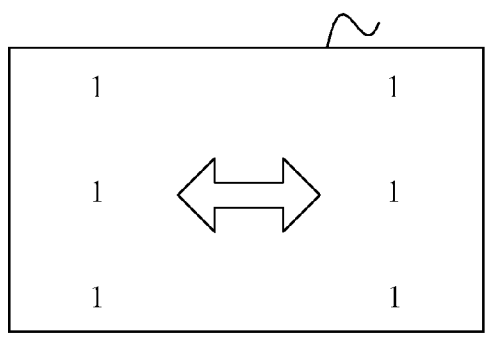

FIG. 17B shows correction coefficients produced for positions (pixels) in the primary restored image, on the basis of the individual correction information of the specific optical apparatus. Each correction coefficient corrects, in the correction process shown in FIG. 15, the restoration degree (that is, the primary image restoration component) such that manufacturing error components at respective positions in the primary restored image are balanced out.

A correction coefficient larger than 1 increases the restoration degree, and a correction coefficient smaller than 1 decreases the restoration degree. It is understood from the individual correction information for the specific optical apparatus that, in the input image obtained through the specific optical apparatus, the left area has a lower MTF than that of the right area due to the partial blurring. Thus, setting the correction coefficients so as to increase the restoration degree of the left area and decrease the restoration degree of the right area enables acquisition of proper restoration degrees (that is, restoration degrees restoring the MTF to 1) over the entire image, as shown in FIG. 17C.

The individual correction information may be information showing a distribution of the image-forming characteristics in the input image, or may be the correction coefficient stored as table data or a function.

Moreover, in the image restoration process, the restoration degree may be changed such that an image restoration effect is provided only to an edge portion in the image where aberration is noticeable. For example, when there are a flat portion where pixel values (signal values of pixels) in the image change little and the edge portion where the pixel values largely change, since the image restoration component corresponds to the aberration component as mentioned above, the edge portion includes an image restoration component whose absolute value is large. On the other hand, the image restoration component of the flat portion includes not only the aberration component, but also an amplified noise component dominantly. Therefore, correcting the image restoration component of the flat portion to zero provides the image restoration effect only to the edge portion and provides no change to the flat portion.

In addition, the restoration degree may be changed, not only between the flat portion and the edge portion, but also according to a change amount of the pixel values, that is, pixel feature information. Methods of changing the image restoration amount according to the pixel feature information include not only correction of the image restoration component, but also correction of the individual correction information or correction of the image restoration component corrected using the individual correction information. The pixel feature information includes a pixel's luminance saturation degree, other than the flat portion and the edge portion.

As described above, this embodiment prepares the image restoration filter whose data amount is large as a common filter for the plural optical apparatuses having the individual variabilities, and acquires a proper restored image (secondary restored image) for each of the optical apparatuses having mutually different image-forming characteristics, by using the individual correction information whose data amount is small. This embodiment thereby enables provision of a good restored image reflecting the individual variability of the optical apparatus while suppressing increase of process time and increase of data amount.

In order to change the restoration degree, it is conventionally necessary to perform image filtering that changes a gain of the image restoration filter using the expression (2) again to reproduce the image restoration filter, which increases load to precisely control the restoration degree for the positions in the image. In contrast thereto, this embodiment needs image combination to change the restoration degree for each pixel according to the individual variability, so that the load is small and thus the correction process can be performed with a high speed.

Providing the image processing apparatus 10 in a lens-interchangeable image pickup apparatus when the optical apparatuses 21, 22, 23, . . . are interchangeable lenses makes it possible to cause the image pickup apparatus to output good restored images with respect to the individual variabilities of the optical apparatuses 21, 22, 23, . . . . This case is also an alternative embodiment of the present invention.

Embodiment 4

Figure 18:
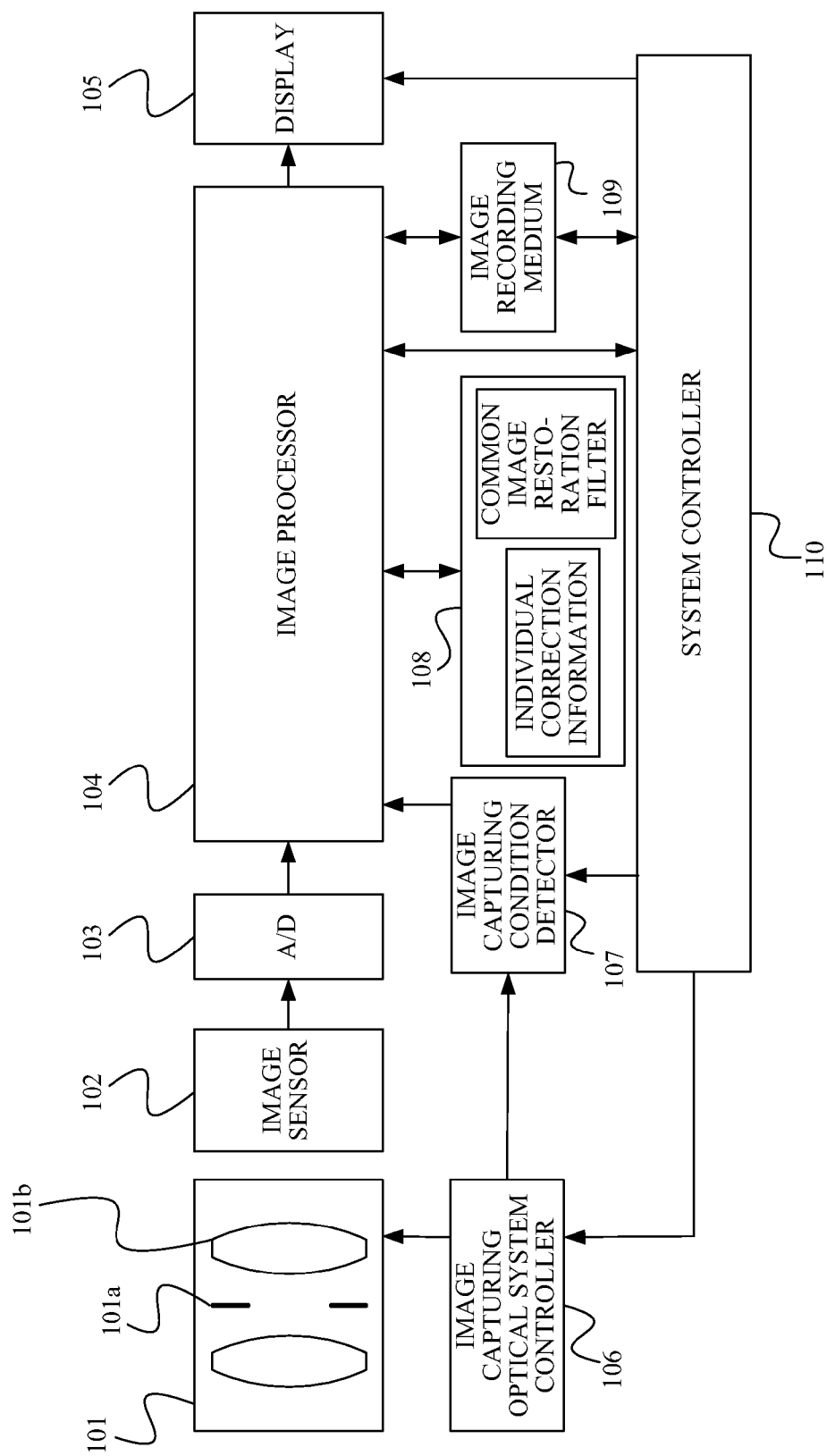
FIG. 18 is a block diagram showing a configuration of an image pickup apparatus that is Embodiment 4 of the present invention.

FIG. 18 shows a configuration of an image pickup apparatus that is a fourth embodiment (Embodiment 4) of the present invention. The image pickup apparatus includes an image capturing system that produces an image by image capturing and the image processing apparatus described in Embodiment 1.

An image capturing optical system 101 causes a light flux from an object (not shown) to form an object image on an image sensor 102 such as a CCD sensor or a CMOS sensor.

The image capturing optical system 101 includes a magnification varying lens (not shown), an aperture stop 101a and a focus lens 101b. Moving the magnification varying lens in an optical axis direction enables zooming to change a focal length of the image capturing optical system 101. Moreover, the aperture stop 101a increases and decreases an aperture diameter to control intensity of light reaching the image sensor 102. The focus lens 101b is controlled in its position in the optical axis direction by an auto focus (AF) mechanism or a manual focus mechanism in order to perform focusing according to an object distance. An image capturing optical system controller 106 controls, in response to control signals from a system controller 110, drive of the magnification varying lens, drive of the aperture stop 101a and the AF.

The image capturing optical system 101 may include an optical filter such as a low-pass filter or an infrared cutting filter. However, in a case where such an optical filter influences a characteristic of an optical transfer function (OTF) of the image capturing optical system 101, the influence of the optical filter is needed to be considered in production of the image restoration filter.

The object image formed on the image sensor 102 is converted into an electric signal (analog output signal) by the image sensor 102. The analog output signal from the image sensor 102 is converted into a digital image capturing signal by an A/D converter 103, and the digital image capturing signal is input to an image processor 104.

The image processor 104 performs various processes on the input digital image capturing signal to produce a color input image. A system from the image sensor 102 to part of the image processor 104 that produces the color input image constitutes an image capturing system. The image processor 104 includes an image restoration part serving as the image processing apparatus that performs the image restoration process described in Embodiment 1 on the input image.

The image processor 104 acquires, from an image capturing condition detector 107, an image capturing condition including a focal length of the image capturing optical system 101, an aperture value thereof and an image capturing distance. The image capturing condition detector 107 may acquire information on the image capturing condition from the system controller 110 or from the image capturing optical system controller 106 that controls the image capturing optical system 101.

In addition, as described in Embodiment 1, the image processor 104 selects the image restoration filter (use image restoration filter) from a storage part 108 or produces the use image restoration filter, according to the image capturing condition. The image restoration filter is a common image restoration filter that is commonly used also for other image pickup apparatuses of a same model as that of the image pickup apparatus of this embodiment. The storage part 108 is provided as a part by which the internal memory 11 in the image processing apparatus 10 is replaced. In addition, the image processor 104 reads individual correction information of the image pickup apparatus of this embodiment from the storage part 108 to produce the correction filter from the read individual correction information, and corrects the use image restoration filter by using the correction filter to produce a corrected image restoration filter. Correction of all the image restoration filters by using the individual correction information may be made before shipping of the image pickup apparatus from a factory or the like.

The image processor 104 performs the image restoration process on the input image by using the corrected image restoration filter. Then, the image processor 104 stores a restored image obtained by the image restoration process to an image recording medium 109 with a predetermined format. Moreover, the image processor 104 causes the restored image to display on a display unit 105.

The image pickup apparatus of this embodiment enables provision of a good restored image reflecting the individual variability of this image pickup apparatus with respect to other image pickup apparatuses while suppressing increase of process time in the image processor 104 and increase of amount of data to be stored in the storage part 108.

Although this embodiment described the image pickup apparatus provided with the image processing apparatus described in Embodiment 1, the image pickup apparatus may be provided with the image processing apparatus described in Embodiment 2. In this case, the image processor 104 performs the image restoration process on the input image by using the use image restoration filter for the image capturing condition, and corrects the restored image acquired thereby by using the correction filter produced from the individual correction information read from the storage part 108.

Moreover, as described in Embodiment 3, the image processor 104 may read the individual correction information of this image pickup apparatus from the storage part 108, and corrects the first image restoration component, which is the difference between the input image and the first restored image, by using the correction coefficient produced on the basis of the individual correction information. Thereby, the image processor 104 produces the second image restoration component.

Then, the image processor 104 combines the second image restoration component with the input image to produce the second restored image as an output image. The image processor 104 stores the second restored image in the image recording medium 109 with the predetermined format and causes the display unit 105 to display the second restored image. Such procedures make it possible to provide a good restored image (second restored image) reflecting the individual variability of this image pickup apparatus with respect to other image pickup apparatuses while suppressing increase of process time and increase of data amount.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application Nos. 2011-104396 and 2011-104397, filed on May 9, 2011 which are hereby incorporated by reference herein in their entirety.

What is claimed is:

1. An image processing method comprising:
   a filter acquiring step of acquiring an image restoration filter to be commonly used for plural optical apparatuses having mutually different optical characteristics;
   a correction information acquiring step of acquiring correction information varying by the optical characteristic of each of the plural optical apparatuses; and
   an image restoration step of restoring an input image produced by image capturing through a specific optical apparatus among the plural optical apparatuses, using the image restoration filter and the correction information for the specific optical apparatus,
   wherein the image restoration step restores the input image using the image restoration filter to produce a first restored image, acquires a first image restoration component corresponding to a difference between the input image and the first restored image, corrects the first image restoration component using the correction information for the specific optical apparatus to produce a second image restoration component, and combines the second image restoration component with the input image to produce a second restored image.

2. An image processing method according to claim 1, wherein:
   the image restoration filter and the correction information are acquired for each of positions in the input image, and
   the image restoration step restores the input image using the image restoration filter and the correction information acquired for each of the positions.

3. An image processing method according to claim 1, wherein the image restoration step restores the input image using the image restoration filter acquired for each of the positions in the input image, and corrects the first image restoration component using the correction information varying by each of the positions to produce the second restored image.

4. An image processing method according to claim 1, wherein the correction information varies by each of color components constituting the input image.

5. An image processing method according to claim 1, wherein the optical characteristic is image-forming characteristics for positions in an image surface of each of the optical apparatuses.

6. An image processing method according to claim 1, further comprising a changing step of changing the correction information according to a pixel feature information of the input image.

7. An image processing method according to claim 1, wherein the correction information acquiring step acquires the correction information from each of the optical apparatuses.

8. An image processing method according to claim 1, wherein the correction information acquiring step acquires the correction information added to the input image.

9. An image processing apparatus comprising:
   a memory storing an image restoration filter to be commonly used for plural optical apparatuses having mutually different optical characteristics; and
   a processor configured to:
      acquire correction information varying by the optical characteristic of each of the plural optical apparatuses;
      restore an input image produced by image capturing through a specific optical apparatus among the plural optical apparatuses, using the image restoration filter to produce a first restored image;
      acquire a first image restoration component corresponding to a difference between the input image and the first restored image;
      correct the first image restoration component using the correction information for the specific optical apparatus to produce a second image restoration component; and
      combine the second image restoration component with the input image to produce a second restored image.

10. An image pickup apparatus comprising:
    an image capturing system configured to perform image capturing to produce an image; and
    an image processing apparatus comprising:
    a memory storing an image restoration filter to be commonly used for plural optical apparatuses having mutually different optical characteristics; and
    a processor configured to:
       acquire correction information varying by the optical characteristic of each of the plural optical apparatus;
       restore an input image produced by image capturing through a specific optical apparatus among the plural optical apparatuses, using the image restoration filter to produce a first restored image;
       acquire a first image restoration component corresponding to a difference between the input image and the first restored image;
       correct the first image restoration component using the correction information for the specific optical apparatus to produce a second image restoration component; and
       combine the second image restoration component with the input image to produce a second restored image.

11. A non-transitory storage medium storing an image processing program executable by a computer to execute an image processing method comprising:
    a filter acquiring step of acquiring an image restoration filter to be commonly used for plural optical apparatuses having mutually different optical characteristics;

a correction information acquiring step of acquiring correction information varying by the optical characteristic of each of the plural optical apparatuses; and an image restoring step of restoring an input image produced by image capturing through a specific optical apparatus among the plural optical apparatuses, using the image restoration filter and the correction information for the specific optical apparatus, wherein the image restoration step restores the input image using the image restoration filter to produce a first restored image, acquires a first image restoration component corresponding to a difference between the input image and the first restored image, corrects the first image restoration component using the correction information for the specific optical apparatus to produce a second image restoration component, and combines the second image restoration component with the input image to produce a second restored image.

* * * * *